(12) United States Patent
Lidström et al.

(10) Patent No.: US 9,294,992 B2
(45) Date of Patent: Mar. 22, 2016

(54) METHOD AND APPARATUS FOR SERVICE SELECTION AND INDICATION

(75) Inventors: Mattias Lidström, Stockholm (SE); Michel Shahan, Copenhagen (DK); Martin Svensson, San Francisco, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 882 days.

(21) Appl. No.: 13/124,460

(22) PCT Filed: Oct. 17, 2008

(86) PCT No.: PCT/EP2008/008816
§ 371 (c)(1),
(2), (4) Date: Apr. 15, 2011

(87) PCT Pub. No.: WO2010/043241
PCT Pub. Date: Apr. 22, 2010

(65) Prior Publication Data
US 2011/0208824 A1    Aug. 25, 2011

(51) Int. Cl.
*G06F 15/16* (2006.01)
*H04W 48/18* (2009.01)
*H04W 84/04* (2009.01)
*H04W 88/18* (2009.01)

(52) U.S. Cl.
CPC ............ *H04W 48/18* (2013.01); *H04W 84/042* (2013.01); *H04W 88/18* (2013.01)

(58) Field of Classification Search
CPC ....... H04W 48/18; H04W 4/02; H04W 88/18; H04L 47/822; H04L 12/16; H04L 41/12; H04L 29/08315; H04L 41/5058

USPC ................ 709/206, 207, 223–224, 226, 250; 370/260, 252, 254, 328, 338, 395.21; 455/456.1
See application file for complete search history.

(56) References Cited

U.S. PATENT DOCUMENTS

| | | | |
|---|---|---|---|
| 2004/0054729 A1* | 3/2004 | Fukuizumi et al. | 709/205 |
| 2004/0121758 A1 | 6/2004 | Hoche et al. | |
| 2007/0286100 A1* | 12/2007 | Saaranen et al. | 370/260 |
| 2008/0025339 A1* | 1/2008 | Le et al. | 370/445 |
| 2008/0214191 A1* | 9/2008 | Yach et al. | 455/435.2 |
| 2009/0030886 A1* | 1/2009 | Pandeya | 707/3 |
| 2009/0215447 A1* | 8/2009 | Catalano et al. | 455/432.1 |

FOREIGN PATENT DOCUMENTS

| | | |
|---|---|---|
| EP | 1107512 A1 | 6/2001 |
| WO | 2008/081040 A1 | 7/2008 |

* cited by examiner

*Primary Examiner* — Andrew Chriss
*Assistant Examiner* — Romani Ohri
(74) *Attorney, Agent, or Firm* — Coats & Bennett, PLLC

(57) ABSTRACT

A technique for providing a service availability indication to a user terminal is described. In a method realization, the technique comprises providing a data structure representative of user terminals and of inter-terminal relationships derived from one or more communication parameters pertaining to communications between the user terminals. Additionally, for at least some of the user terminals service utilization information for each of a plurality of services is provided. The technique further includes selecting, for at least one user terminal and from the plurality of services, a service not used by the at least one user terminal, wherein the service selection is based on the service utilization information provided for user terminals having a predefined association with the at least one user terminal as determined by the inter-terminal relationships, and sending a message indicative of the selected service to the at least one user terminal.

26 Claims, 11 Drawing Sheets

| Terminal ID 123456789 | 202 |
| --- | --- |
| Relationships with Terminal IDs:<br>1. 123456781<br>2. 123456782<br>3. 123456783<br>4. 123456784<br>5. 123456785<br>6. 123456786<br>7. 123456787 | 204 |
| Quantification of Relationships:<br>1. xyz; acb; jkli<br>2. zzz; aab<br>3. ab; zyxx<br>... | 206 |
| Service Utilization Information:<br>1. Service xxx: ab; ij;...<br>2. ... | 208 |

METHOD AND APPARATUS FOR SERVICE SELECTION AND INDICATION

TECHNICAL FIELD

The disclosure generally relates to communication networks. Specifically, the disclosure relates to the technical field of providing indications regarding the availability (including the existence) of services to a user terminal in a communication network.

TECHNICAL BACKGROUND

In today's communication networks there exists a plethora of different communication services. The available communication services include traditional telecommunication services such as voice services, data services, the Short Message Service (SMS) and the Multimedia Messaging Service (MMS). Additionally, Instant Messaging (IM) and community-based communication services (typically on the basis of the Internet Protocol, or IP) potentially involving more than two communication partners become increasingly popular. IP-based community services include for example blogging, virtual forums, and so on.

As a result of the large number of different communication services currently in use, the communication environment as a whole has become rather heterogeneous. The heterogeneous nature of the communication environment is expressed by the fact that many of the communication services, and in particular community-based communication services, are not standardized. Also, different user terminals (such as different mobile telephones) often support different sets of communication services, which means that in relation to a specific communication service two user terminals may sometimes not be compatible with each other. The heterogeneous nature of the communication environment thus prevents to a certain extent the connectivity among user terminals.

In other circumstances, the connectivity among user terminals is simply limited because a certain user may not be aware of a particular communication service supported by his or her user terminal in its current configuration, or after a quick software update or service subscription. In other words, the user may have more options of communicating via the user terminal than he or she is actually aware of.

If, for example, a user terminal supports traditional telecommunication services via a cellular communication network (e.g., according to the Universal Mobile Telecommunications System, or UMTS, specifications) and additionally community-based communication services (that may also be provided via a Wireless Local Area Network, or WLAN), the user may only be aware of the UMTS capabilities of his or her terminal. As a result, the user will be prevented from any communication in areas having WLAN coverage only, although the terminal may support network access via WLAN. The lack of connectivity that ensues is of particular annoyance if many of the potential communication partners of the user regularly make use of such community-based communication services. On the other hand it may be useless in many situations to notify the user about supported communication services that he or she will not be using because there are no or only a few potential communication partners.

What has been said above in relation to communication services likewise applies to certain application services. That is, a user may in many cases benefit from currently unused application services that are in principle supported by his or her terminal.

SUMMARY

What is needed is a technique which more efficiently provides service availability indications to a user terminal in a communications network.

According to a first aspect, a method of providing a service availability indication to a user terminal is provided. The method comprises providing a data structure representative of user terminals and of inter-terminal relationships derived from one or more communication parameters pertaining to communications between the user terminals, providing for at least some of the user terminals service utilization information for each of a plurality of services, selecting, for at least one user terminal and from the plurality of services, a service not used by the at least one user terminal, wherein the service selection is based on the service utilization information provided for user terminals having a predefinded association with the at least one user terminal as determined by the inter-terminal relationships, and sending a message indicative of the selected service to the at least one user terminal. As understood herein, the term "plurality" relates to a number greater than one.

The data structure may be realized in various forms such as in the form of an abstract data model or in the form of a plurality of data sets. The data structure may be configured to be represented or may be capable of being represented as a network graph with nodes and edges connecting two nodes each. In the network graph, the nodes correspond to user terminals and the edges may be derived from the inter-node relationships. An edge may, for example, be used to connect two nodes that represent user terminals between which a communication link had been established in the past. When a network graph is used, the predefined association between user terminals (i.e., nodes of the network graph) underlying the service selection may be defined in terms of topology-related features of the network graph.

The service selection procedure may be performed in the context of indicating to a user terminal an available service currently and/or previously not used by this user terminal. The selection may take into account the technical capabilities of the specific user terminal to make sure that only services actually supported by the user terminal (including cases in which only software updates or service subscriptions are required) are recommended. The predefined association between the user terminal that forms the target of the recommendation and other user terminals that already make use of the recommended service can be expressed in the form of one or more criteria. The criteria may directly or indirectly (e.g., via the topology of the network graph) relate to the inter-terminal relationships as derived from the one or more inter-terminal communication parameters.

In one example, the predefined association underlying the service selection procedure comprises a criterion expressed as a distance measure in terms of the network graph or applicable to the network graph. The distance measure can be a predefined number of "hops" interconnecting specific nodes in the network graph. In one implementation, the service selection may for example be based on the service utilization information provided for user terminals being direct neighbours of the user terminal to which the service availability indication is to be transmitted. In another implementation, the service selection may be based on the service utilization information provided for user terminals that can be reached with a predefined maximum number of hops (such as one, two or three hops) from the user terminal that forms the target of the service availability indication.

In the network graph each edge may be associated with metrics information quantifying an interrelation between the two nodes connected by the specific edge. The metrics information may at least partly be derived from the one or more communication parameters (or, which will in may cases be equivalent, from the inter-terminal relationships). Alternatively, or in addition, the metrics information may be derived from other parameters such as the topology of the network graph. Parameters derived from the topology of the network graph include, for example, the existence of cliques or the nature of transitive relationships from the perspective of a particular node. In cases in which metrics information is provided, the predefined association underlying the service selection procedure may comprise a criterion expressed in terms of the metrics information or applicable to the metrics information.

The edges in the network graph may be directed (i.e., may be indicative of a preferential direction illustrated, for example, by an arrow head). Directed edges may be used in various contexts, for example to express a level of trust among users of different user terminals having an inter-terminal relationship. Some general properties of trust include that it is transitive and asymmetric (i.e., trust is typically not bidirectional). In the case of directed edges, the predefined association underlying the service selection procedure may comprise a criterion expressed in terms of edge direction or applicable to edge direction.

At least some of the nodes in the network graph (or user terminals in the data structure) may be ranked, and the predefined association underlying the service selection may then comprise a criterion expressed in terms of the ranking. In one variant, the nodes are ranked based on at least one of their membership in cliques and the existence of transitive relationships in terms of the network graph.

For a specific edge in the network graph, separate items of metrics information may be provided for each of a plurality of communication services. In such a scenario, the evaluation of whether or not to provide a service availability indication in relation to a specific communication service is performed on the basis of the metrics information provided for this specific communication service. In other words, the evaluation of different communication services in relation to one single edge will involve different items of metrics information.

According to a first variant, the service utilization information pertains to communication services. The selected service will thus be a communication service. Possible communication services include one or more of voice services, data services, multimedia services, text-based services, Instant Messaging services and community-based communication services. In another variant, the service utilization information pertains to application services, and the selected service will thus be an application service. Possible application services include in particular (but not exclusively) mobile application services such as mobile gaming applications potentially involving the participation and interaction of a plurality of mobile user terminals and location finder applications (i.e., applications guiding a user operating the mobile terminal to a specific site). The application services may be services that are provided via a service-provisioning network to which the user terminals can attach via a communication service and communication network.

In one scenario, the individual services are ranked in accordance with the service utilization information. This means, for example, that frequently used services are ranked higher than services that are used only seldomly. In other words, the service ranking may depend on the usage of each individual service by an individual user terminal, by the terminals considered in the data structure or by larger terminal populations. The service selection may in such a case be based also on the service ranking.

The one or more communication parameters underlying the inter-terminal relationships may include one or more of the following: communication partner(s), duration of communication, number of communications, communication direction, and kind of utilized communication service. Of course, the inter-terminal relationships may also be derived taking into account other parameters not directly related to the communication between exactly two user terminals (such as the routing of a message from a first user terminal via a second user terminal to a third user terminal). There exist various possibilities of acquiring the communication parameters. The communication parameters may, for example, be obtained from at least one of call detail records, event detail records, communication network interface probing, and user terminal agents.

According to a further aspect, a computer program product is provided which comprises program code portions for performing the steps of one or more of the methods and method aspects described herein when the computer program product is executed one or more computing devices. The computer program product may be stored on a computer readable recording medium, such as a permanent or re-writeable memory within or associated with a computing device, a CD, DVD, and so on. Additionally, or in the alternative, the computer program product may be provided for download to a computing device, for example via a data network such as the Internet or a dedicated communication line such a telephone line or wireless link.

According to a still further aspect, a device for providing a service availability indications to a user terminal is provided. The device comprises a storage providing a data structure representative of user terminals and of inter-terminal relationships derived from one or more communication parameters pertaining to communications between the user terminals, and additionally providing for at least some of the user terminals service utilization information for each of a plurality of services, a processor adapted to select, for at least one user terminal and from the plurality of services, a service not used by the at least one user terminal, wherein the service selection is based on the service utilization information provided for user terminals having a predefined association with the at least one user terminal as determined by the inter-terminal relationships, and an output interface for sending a message indicative of the selected service to the user terminal. The storage may be located at a single site (e.g., in the form of a single database). In an alternative implementation, the storage is distributed among two or more sites (e.g., in the form of two or more dedicated databases).

In one configuration, the data structure is adapted to be represented (e.g., on a computer monitor or any other display device) as a network graph with nodes and edges, wherein the nodes are representative of the user terminals and wherein the edges connect two nodes each and are derived from the inter-node relationships. In a network graph scenario, the predefined association underlying the service selection may comprise a criterion expresses as a distance measure in terms of or applicable to the network graph.

The device and its components may be configured to perform one or more steps of the methods described herein.

BRIEF DESCRIPTION OF THE DRAWINGS

In the following, further details and aspects will be discussed with reference to exemplary embodiments illustrated in the drawings, wherein

FIG. 2 illustrates an embodiment of a data structure;

DETAILED DESCRIPTION

In the following description, for purposes of explanation and not limitation, specific details are set forth in order to provide a thorough understanding of the techniques presented herein. It will be apparent to one skilled in the art that these techniques may be practiced in other embodiments that depart from these specific aspects. For example, a person skilled in the art will appreciate that the techniques may practiced not only in relation to a mobile communications environment, but also in relation to wired communication systems.

The person skilled in the art will further appreciate that the functions explained herein below may at least partially be implemented using individual hardware circuitry, using software functioning in conjunction with a programmed microprocessor, Field-Programmable Gate Array (FPGA), an Application Specific Integrated Circuit (ASIC) and/or a Digital Signal Processer (DSP).

Figure 1:
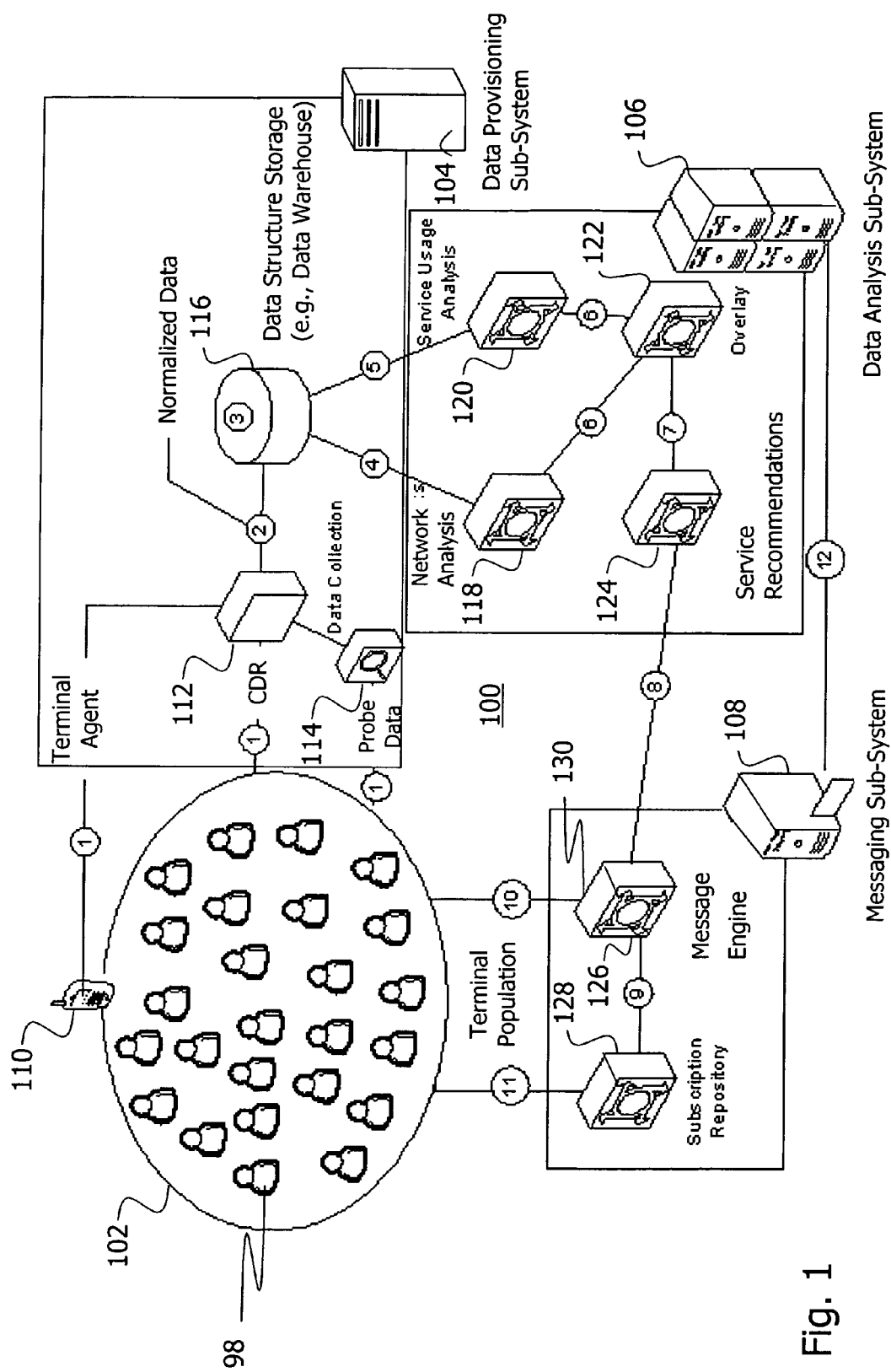
FIG. 1 illustrates an embodiment of a device for providing service availability indications to user terminals.

An exemplary embodiment of a technique for providing service availability indications will now be described with reference to FIG. 1. FIG. 1 illustrates an exemplary embodiment of a device 100 comprising various sub-systems cooperating in the process of generating and providing service availability indications for a population 102 of user terminals 98.

The terminal population 102 is typically a mixture of mobile and stationary terminals 98 configured to communicate with each other via a plurality of communication networks and network access techniques. The terminal population 102 may, for example, comprise mobile telephones, personal digital assistants, data or network cards, personal computers, laptops, and so on. The communication networks enabling a communication among the user terminals may include the Internet, mobile and stationary telephone networks and so on. Possible network access techniques employed by the user terminals may include wireless network access techniques (e.g., Wideband Code Division Multiple Access, or WCDMA, and Long Term Evolution, or LTE, techniques) as well as wired network access techniques (e.g. Digital Subscriber Line, or DSL, techniques).

In the exemplary embodiment illustrated in FIG. 1, the overall device 100 comprises three dedicated sub-systems, namely a data provisioning sub-system 104, a data analysis sub-system 106 as well as a messaging sub-system 108. The data provisioning sub-system 104 comprises components adapted to gather data relating to the user terminal population 102. Such data include communication parameters pertaining to communications between the user terminals 98 as well as service utilization parameters pertaining to the utilization of various services (such as communication and application services) by the user terminals 98. In the particular case of communication services, communication parameters and service utilization parameters may at least partially be identical. As one example, the duration of a specific communication session constitutes a communication parameter that can also be regarded as a service utilization parameter in relation to the specific communication service underlying the communication session.

The data gathered by the data provisioning sub-system 104 is provided to the data analysis sub-system 106. The data analysis sub-system 106 is configured to evaluate the data provided by the data provisioning sub-system 104 in relation to individual user terminals 98 (or, which will in many cases be equivalent, in relation to individual subscribers or service subscriptions). The main purpose of the data analysis sub-system 106 is the identification of individual communication services that may increase the connectivity of individual user terminals 98 as well as the identification of individual application services that may increase the usability of individual user terminals 98.

As shown in FIG. 1, the data analysis sub-system 106 is coupled to the messaging sub-system 108. The messaging sub-system 108 is configured to receive information relating to individual user terminals and individual services from the data analysis sub-system 106 and to generate and address messages indicative of available services to individual user terminals 98 of the terminal population 102.

In the following, the components and processing operations of the individual sub-systems 104, 106 and 108 will be described in more detail to provide a better understanding of the exemplary embodiment illustrated in FIG. 1. In this regard, reference will be made to the schematic data structure 200 of FIG. 2, the exemplary network graph 300 of FIG. 3 as well as the flow chart 400 of FIG. 4.

In a first operational stage the data provisioning sub-system 104 collects information about the terminal population 102 from the communication networks and the service provisioning networks such as the IP Multimedia Subsystem (IMS) utilized by the terminal population 102. Such information typically includes various communication parameters as well as various service utilization parameters. The communication parameters may be provided for each of a plurality of communication services such as voice services (including conventional telephony services), data services, multimedia services (including MMS), text-based services (including SMS), IM services and community-based communication services (such as blogging and virtual forums). The communication parameters gathered for each of these communication services may include one or more of a duration of communication, communication partners (e.g., in the form of permanent network addresses of the involved user terminals 98), number of communications (e.g., number of SMSs exchanged between two specific user terminals 98), communication direction (e.g., uni-directional or bi-directional), and kind of utilized communication service (e.g., telephony service or MMS).

In the case of communication services, the service utilization parameters may be derived from or comprise one or more of the communication parameters and optionally further service-specific information. In the case of application services, the service utilization parameters may comprise at least one of the kind of utilized application service (e.g., an IMS service), the number of service utilizations (e.g., the total number a specific IMS service has been involved) as well as the total duration of service utilization (e.g., in minutes or hours).

The information about the terminal population 102 may be gathered in various ways. The data provisioning sub-system 104 comprises for example terminal agents 110 residing on individual user terminals 98 of the terminal population 102 and automatically collecting the required information and transmitting the collected information to a central data collection module 112 of the data provisioning sub-system. The terminal agents 110 may, for example, be realized in the form of dedicated software modules running on at least some of the user terminals 98 constituting the terminal population 102.

The data collection component 112 may also collect information about the terminal population 102 via Call Detail Records (CDRs) and Event Detail Records (EDRs) that can be obtained from network operator databases or via the terminal agents 110. The CDR and EDR data can be considered as low level data describing user behaviour (e.g., duration of a specific communication session) and user relationships (e.g., network addresses, including telephone numbers, of the involved communication partners).

A further possibility of obtaining information about the terminal population 102 is the probing of network interfaces via a dedicated monitoring component 114 that is coupled to the data collection component 112. In one variant, the monitoring component 114 is located for traffic monitoring at a predefined interface of a communication network. In the example of an UMTS network, the monitoring component 114 may be located at the Uu interface, the Iu CS interface or the Iu PS interface. In another variant, the monitoring component 114 is located at an interface of a service-provisioning network. In the example an IMS network, the monitoring component 114 may be located at the interface between a Call Session Control Function (CSCF) node and an IMS Application Server (AS).

The main purpose of the data collection module 112 is the collection of the required information about the terminal population 102 as well as an enriching of the collected information with further data as needed. As the information collected by the data collection module 112 will typically be of a very heterogeneous nature, a further important task of the data collection component 112 relates to normalizing the collected information. The normalization operation performed by the data collection component 112 includes discarding events, calls or user terminals having an extremely deviant behaviour. The normalization operation additionally includes bringing the collected information into a standardized format. The normalized data are transferred in a second stage of the overall procedure illustrated in FIG. 1 into a data warehouse 116 or any other data storage.

In the data warehouse 116, the normalized data received from the data collection component 112 is aggregated according to predefined aggregation rules. The data aggregation operation is performed in a third stage of the overall procedure illustrated in FIG. 1. Possible aggregation rules may, for example, specify that for a specific user terminal 98 the durations of individual communication sessions (e.g., in relation to a specific telephony service) are summed up. Another aggregation rule may specify that for communications involving a specific user terminal 98 all communication partners are stored.

Figure 4:
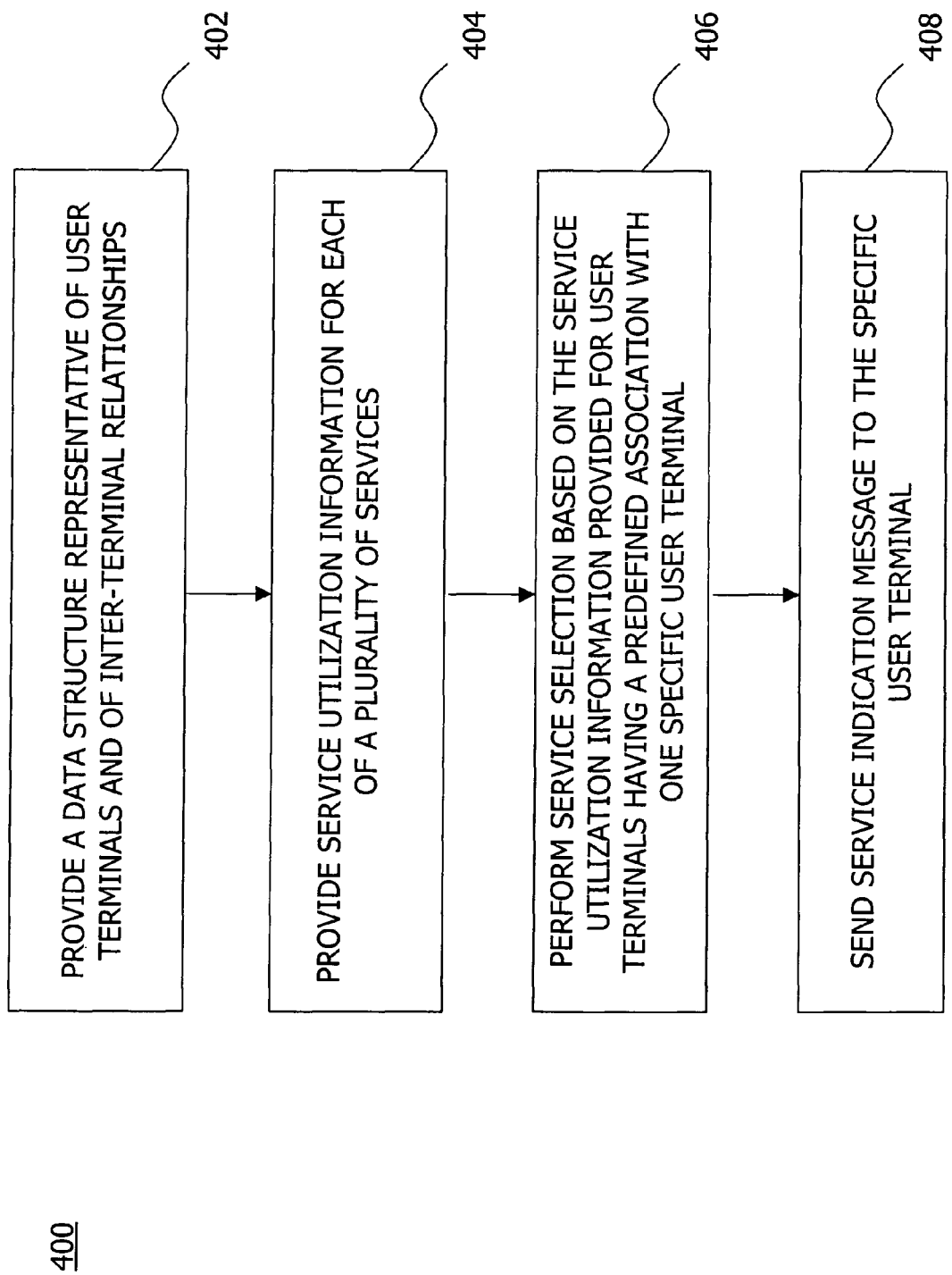
FIG. 4 shows a flow diagram schematically illustrating a method embodiment.

As a result of the aggregation process, the data warehouse 116 provides a data structure representative of the user terminals 98 and of inter-terminal relationships derived from one or more communication parameters pertaining to communications between the user terminals 98 as illustrated in the flow diagram 400 of FIG. 4 (step 402). The data structure or another component within the data warehouse 116 or external to the data warehouse 116 may additionally provide service utilization information for each of a plurality of services utilized by the terminal population 102 (see step 404 of the flow diagram 400).

FIG. 2 illustrates an exemplary embodiment of a data structure 200 that results from aggregating in the data warehouse 116 normalized data as received from the data collection component 112. In the example illustrated in FIG. 2, the data structure 200 comprises for each user terminal 98 of the terminal population 102 (see FIG. 1) an individual data set. Each data set is identified by a terminal ID 202. The terminal ID 202 may be a permanent network address of a user terminal such as its Mobile Station ISND Number (MSISDN).

Each data set comprises a data set portion 204 indicative of inter-terminal communication relationships of the specific user terminal 98. As shown in FIG. 2, the communication relationships may be identified by the terminal IDs of frequent communication partners. Moreover, each data set comprises a further data set portion 206 quantifying the individual communication relationships listed in portion 204.

Possible quantifications of a communication relationship may include or be derived from communication parameters such as a total duration of communication with a specific communication partner, the number of communications with the specific communication partner, the communication direction as well as the kind of utilized communication service. The data set portion 206 will thus also include service utilization information for the various communication services used by the specific user terminal 98.

As an option, each data set may further comprise a dedicated data set portion 208 for storing supplemental service utilization information. The supplemental service utilization information stored in data set portion 208 may, for example, comprise information relating the usage of application services or any other non-communication services.

The aggregation operation performed by the data warehouse 116 may be performed in a time-controlled manner. For example, the aggregation can be performed on a day-to-day basis, on an hourly basis or by splitting between weekdays and weekends. For each specific time unit (e.g. hour, day, etc.) separate data sets in accordance with the underlying data structure may be generated.

Turning now to the operation of the data analysis sub-system 106 and the fourth stage of the overall procedure illustrated in FIG. 1, for each individual user terminal 98 (or subscription) a network graph is derived for each specific service (e.g., for each communication service) on the basis of the data stored as data structure 200 in the data warehouse 116. The network graph is generated by a network analysis component 118 of the data analysis sub-system 106. In brief, the network analysis component 118 generates for each user terminal and service a graph similar to the network graph 300 illustrated in FIG. 3.

Figure 3:
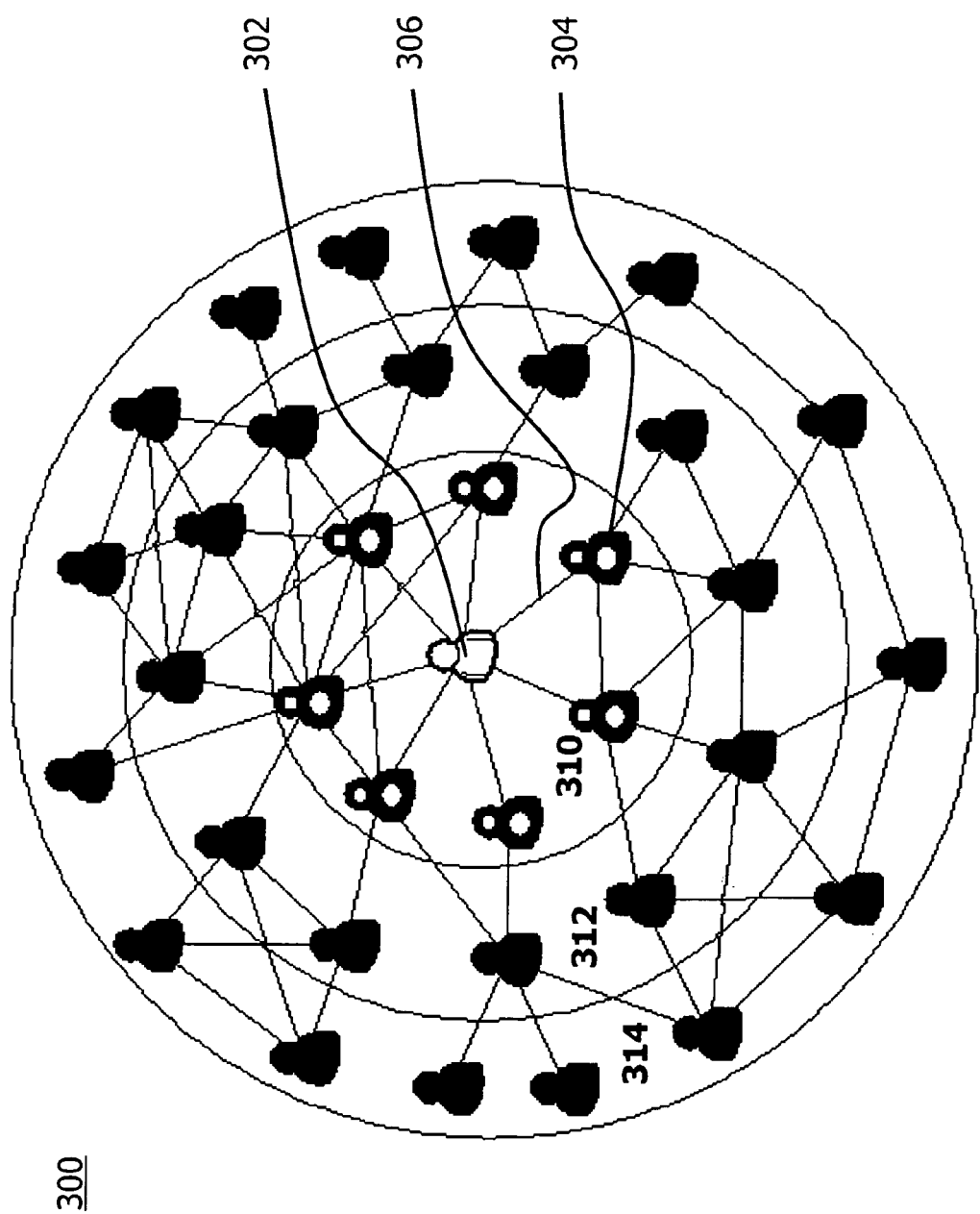
FIG. 3 illustrates a network graph comprising nodes and edges derived from the data structure of FIG. 2.

The network graph 300 of FIG. 3 consists of nodes (such as nodes 302 and 304) and of edges (such as edge 306) connecting two nodes each. The nodes of the network graph 300 are representative of the user terminals 98, whereas the edges are derived from the inter-terminal communication relationships.

The exemplary network graph 300 of FIG. 3 has been derived based on the data set illustrated in FIG. 2 for the exemplary node 302 representative of the user terminal with terminal ID 123456789. As becomes apparent from the data set portion 204 in FIG. 2, this user terminal has (direct) communication relationships with seven other user terminals. For this reason, the node 302 is directly connected via edges with seven neighbouring nodes (such as node 304 which may correspond to the user terminal with terminal ID 123456781). In order to reduce the complexity of the network graph 300, only such communication relationships that exceed a predefined lower threshold (e.g., in terms of number of communications or total duration of communication) will be listed in the data set portion 204.

It should be noted that upon generation of the network graph 300 by the network analysis component 118 not only the direct neighbours of node 302 (e.g., the direct communication partners listed in the data set portion 204) are considered, but also indirect neighbours (also called transitive neighbours). As understood herein, indirect neighbours are direct neighbours of neighbours of the node 302 that are themselves not direct neighbours of the node 302. In this way, several levels of indirect neighbourship can be defined. As shown in FIG. 3, the direct neighbours of the node 302 (such as node 304) belong to a first neighbour level 310, whereas the indirect neighbours of the node 302 are located in further neighbour levels 312, 314, etc. depending on whether they are direct or indirect neighbours of the direct neighbours of node 302.

The number of neighbour levels considered for a specific node 302 in a specific network graph 300 is typically restricted to reduce the overall complexity of the network graph 300 and its topological analysis. In many cases it will be sufficient to consider one to three neighbour levels. As will be understood, the identification of neighbours in the outer neighbour levels 312 and 314 of the node 302 requires the evaluation of data sets that are provided in the data warehouse 116 for the neighbours of the node 302 (such as for node 304).

Based on the various neighbour levels 310, 312, 314, a distance measure can be defined in the network graph 300. For example, the direct neighbours of node 302 have the smallest distance from this node 302, the first level neighbours (neighbour level 312) will have the second smallest distance from the node 302, and so on. As a result, a distance criterion may be defined for a graph-based service selection procedure that will be described in more detail below.

In an optional embodiment, each edge (such as the edge 306 connecting the two nodes 302 and 304) is additionally associated with metrics information quantifying an interrelation (or relationship) between the two nodes connected by the edge. The metrics information can be derived from the communication parameters as stored for a specific user terminal in data set portion 206 of the corresponding data set (see FIG. 2). Moreover, the metrics information may be derived from the topology of the network graph 300 as will be explained below.

Separate items of metrics information may be provided for each of a plurality of services utilized by the specific terminal. In the example of a specific communication service, the metrics information may be derived based on the communication direction (e.g., one-way communication, two-way communication, etc.), the number of communications (e.g., the number of SMSs sent from one user terminal to another), the total duration of communication between two user terminals, and so on.

In the most simple case, the metrics information consists of a single number generated based on an evaluation of multiple communication parameters and/or the network graph topology. It is important to note that separate metrics information can in principle be generated for each service that allows to define user-to-user relationships (including IM services, community-based communication services, certain application services, etc.).

In addition to generating the network graph 300, the network analysis component 118 is also in charge of analyzing the generated network graph 300 in relation to various topological criteria that may later on be utilized in connection with the service selection procedure. Such topological criteria may include the membership of individual nodes in so-called cliques, the existence of transitive relationships (i.e., of indirect neighbours), and so on. Additionally, each node in the network graph 300 may be ranked according to topological criteria, and the ranking may then be considered during the service selection procedure. The network graph analysis and node ranking operations as performed by the component 118 will be described in more detail later on with reference to FIGS. 5 to 11.

In a fifth operational state of the overall procedure illustrated in FIG. 1, the service utilization information as provided by the data warehouse 116 is analyzed in relation to individual services and a specific user terminal 98. As shown in FIG. 1, the service utilization analysis is performed by a dedicated service utilization component 120. It should be noted that the analysed services are not necessarily limited to the services actually used by the user terminal under investigation (such as the user terminal corresponding to node 302 in FIG. 3). Rather, the service utilization for all nodes in the specific network graph (such as for node 304) will be analysed. As a result of the service utilization analysis, a list of services utilized within a given network graph such as the network graph 300 of FIG. 3 will be determined.

In an optional mode, the service utilization analysis additionally includes a service ranking. Each analysed service may, for example, be ranked in accordance with the total usage of this service among the nodes belonging to the particular network graph. In other words, the service with the highest total service usage (e.g., in terms of usage duration or number of usages) will be ranked highest. Service ranking may individually be performed for each neighbour level. In the network graph scenario illustrated in FIG. 3 this approach would thus result in three separate service rankings.

In a next operational stage of the overall processing procedure illustrated in FIG. 1, for some or more individual user terminals 98 an overlay component 122 analyses (or "overlays") the network graph 300 and the associated (metrics and other) information as generated by the network analysis component 118 in combination with the service ranking(s) as determined by the component 120 in charge of service utilization analysis. The purpose of this analysis performed by the overlay component 122 is to select for the specific user terminal corresponding to node 302 in the network graph 300 one or more of the ranked services for recommendation.

Specifically, the selection is performed such that a highly ranked service currently not used by the specific user terminal is determined to enhance the connectivity and/or usability of the specific user terminal. As illustrated in step 406 of flow diagram 400 (see FIG. 4), the service selection procedure is based on the service utilization information that has been obtained for neighbouring user terminals having a predefined association with the specific user terminal for example in terms of the network graph 300.

During one possible realization of the service selection procedure, a distance measure is applied according to which the likelihood of a specific service being selected increases if the specific service is utilized by many close neighbours (such as neighbours within the first neighbour level 310 illustrated in FIG. 3). The reason for this approach of analyzing the associated neighbouring user terminals is the fact that the connectivity and/or usability of the specific user terminal would in particular increase if the selected service is already used by close neighbours. In other words, if user terminal A will be recommended a service because user terminals C, D and E in the network graph of user terminal A use this service, this recommendation is cross-validated against how close user terminal A and user terminals C, D and E are in the network graph. In case the accumulated distance measures for the three user terminals C, D and E in relation to user terminal A (or any other distance criteria) should exceed a predefined threshold, the particular service will not be considered further.

During the service selection procedure performed by the overlay component 122, various individual criteria and combinations of criteria can be considered. As has been mentioned above, the rank of an individual service can be taken into account as well as the closeness of user terminals already using this service. Additionally, the metrics information associated with each edge in the network graph 300 can be considered as well as optional rankings of the various nodes in the network graph 300. Other topological criteria of the network graph 300 may be considered as well.

The overlay component 122 outputs for each analysed user terminal 98 one or more service indications for being sent to the corresponding user terminal 98 via a communication network. The service indications output by the overlay component 122 are sent in a seventh operational stage to an optional service recommendation component 124 which forwards these service recommendations in an eight operational state to the messaging sub-system 108 as shown in FIG. 1.

The service recommendation component 124 identifies one or more microsegments in the network graph 300 of the particular user terminal (node 302) based on the analysis performed by the overlay component 122, the service utilization component 120 and the network analysis component 118. Specifically, the microsegments identified by the service recommendation component 124 include nodes in the network graph 300 having a similar service usage behaviour and/or topological interrelation. Within the identified microsegments, services may then be recommended based on the level of penetration of the services within the nodes constituting the microsegment. In other words, if many nodes within an identified microsegment make use of a specific service, this service may than be recommended to other nodes within the microsegment not yet making use of this service. The identification of microsegments within the network graph 300 may be performed using the techniques described below with reference to FIGS. 5-11.

In the messaging sub-system 108, the service indications regarding the services selected by the overlay component 122 (and possibly filtered by the service recommendation component 124) are received together with an indication of the particular user terminal 98 for which service selection has taken place by the message engine 126. The message engine 126 then contacts in a ninth stage of the processing chain a subscription database or repository (such as a Home Location Register, or HLR) to obtain contact information (e.g., the permanent network address) of the user terminal 98 for which service selection has taken place. Then, in a tenth stage illustrated in FIG. 1, a message (e.g., an SMS or e-mail) indicative of the one or more selected services is sent to the user terminal 98 within the terminal population 102 using its network address as received from the subscription repository 128. The message is sent via an output interface 130 of the messaging sub-system 108 and informs the user terminal 98 of the availability (e.g., the existence) of the one or more selected services. This process corresponds to step 408 in the flow diagram 400 of FIG. 4. The user terminal 98 receiving the message may be configured to automatically initiate all the necessary steps to obtain access to the recommended service. Alternatively, a user interaction (such as a user confirmation) may be expressly requested.

In addition to outputting the service indication message, a flag or other identifier is set in the subscription repository 128. The flag setting is then evaluated in a final, eleventh stage upon receipt of feedback from the specific user terminal 98. Feedback may consist in a message requesting for example, a software download, subscription update, and so on in order to make the recommended service available to the specific user terminal 98. By evaluating the feedback based on the flag settings a corresponding feedback may be provided from the messaging sub-system 108 to the data analysis sub-system 106 to implement machine learning algorithms in the service selection procedure applied by the overlay component 122.

The service indication message sent from the message engine 126 to the user terminal 98 may specifically refer to and/or describe the available service. A service reference in the message may, for example, include an identifier, an IP address or a Universal Resource Locater (URL) of a service. Optionally, the message may also include information regarding the steps that need to be taken in order to enable the use of the specific service. Moreover, the message may include an indication regarding the user terminals close in the terms of the network graph 300 to the recipient 98 of the recommendation that already make use of this service. Additionally, a service usage profile in relation to the recipient 98 may be enriched with information gathered for user terminals close to the recipient in terms of the network graph 300.

Having thus described the overall procedure illustrated in FIG. 1 in some detail, some optional operation modes of the network analysis component 118 with respect to analysing the network topology will now be considered further. The result of the topological analysis may be used to define criteria for the service selection process carried out by the overlay component 122.

Interpreting the network graph 300 of FIG. 3 as (also) being indicative to a certain extent of a social network, it is evident that a service indication or recommendation that is made for a service used by a user terminal operated by a close friend of the operator of the user terminal under investigation will be particularly strong and useful for the latter. For this reason there is a need for an abstract mechanism to determine the "strength" of a particular inter-terminal (or "inter-user") relationship (i.e., the "strength" of a tie corresponding to an edge in the network graph 300).

In the following, several abstract mechanisms to tackle this need purely on the basis of analysing the network graph topology will be discussed. The resulting mechanisms can be implemented by the analysis component 118 of FIG. 1 in context with providing further metrics information in relation to nodes and/or edges. This further metrics information may then form an additional basis for the service selection operation performed by the overlay component 122. However, it will be appreciated that the techniques discussed hereinafter can also be performed in any other contexts. In particular, the following techniques can be performed in context with recommending items different from services to entities different from user terminals.

From the perspective of the network graph 300, social groups will appear as so-called clusters of individual nodes. One typical feature of clusters is the fact that they are closely connected by edges representative of communication links. If a cluster is fully connected, all nodes (also called vertices) in the cluster are connected to each other, they are as tightly clustered as they can get.

Cliques

Figure 5:
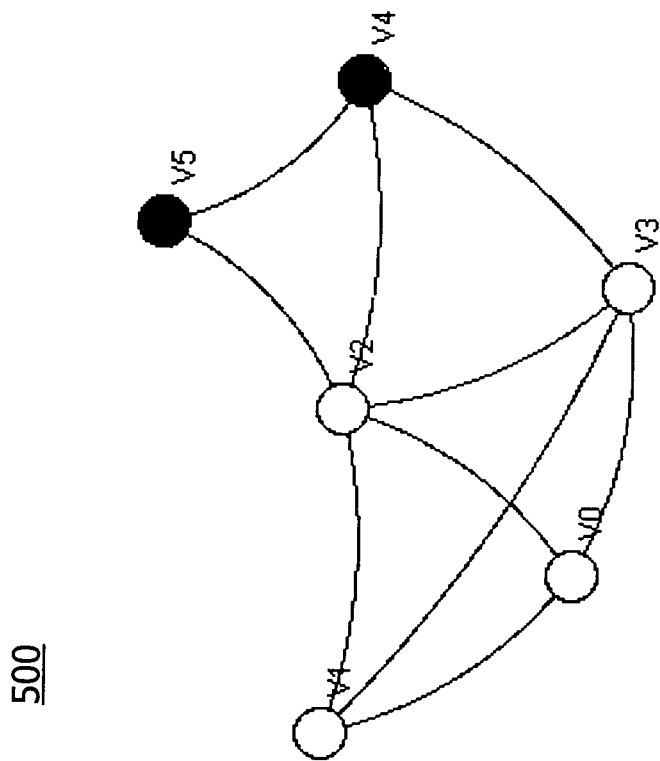
FIG. 5 schematically illustrates a network graph comprising a plurality of cliques.

A complete graph is a graph where all the nodes (sometimes also called vertices) have direct connections (i.e., edges) to each other. In a larger graph it is interesting to find subgroups of nodes which form a complete graph. A graph can contain several subgroups which are complete, and finding out how many, the biggest, and which they are is called the clique problem (finding the maximum cliques) in graph theory. FIG. 5 shows a clique which is created by four of the nodes {V0; V1; V2; V3}. These four nodes are all fully connected, i.e. all the nodes have edges with each other, and form the largest clique in the network graph 500 of FIG. 5 (a four clique). Unfortunately the clique problem is Non-deterministic Polynominal time (NP). This means that it is hard, if not impossible to create an algorithm that can easily scale and the computational time grows exponentially with the size of the graph. So a workaround for or approximation of the clique problem would be advantageous.

All cliques larger than three can be divided into cliques of size three (i.e., having exactly three nodes each). This means that all cliques can be presented as a set of cliques of size three. The formula that calculates how many sub-cliques exist in a large clique of size n is defined by the following formula:

$$\frac{n \times (n-1)}{2}.$$

For example, the clique of size n=4 as illustrated in FIG. 5 could be divided into 6, $$\left(\frac{4 \times 3}{2}\right),$$

cliques of size three. A user terminal in the network graph with 2 cliques, one of size 3 and one of size 4, would have a combined clique of size 9. In this way one can compare different user terminals with respect to how many and how big their cliques are. It has been found that the number of cliques which two user terminals have in common will be a measure of how good their relation is. Corresponding metrics information can thus be added to their relationship (i.e., to the interconnecting edge in the picture of a network graph) and evaluated during the service selection procedure.

Transitive Relationships

Transitive relationships are relationships which have a distance in the graph from the node under consideration (such as the node 302 in FIG. 3) that is larger than one, i.e. that correspond to indirect neighbours in the terminology used above. Nodes that have a relationship to the node under consideration through another node are not expected to have as close relation to that node as nodes that are direct neighbours.

Figure 6:
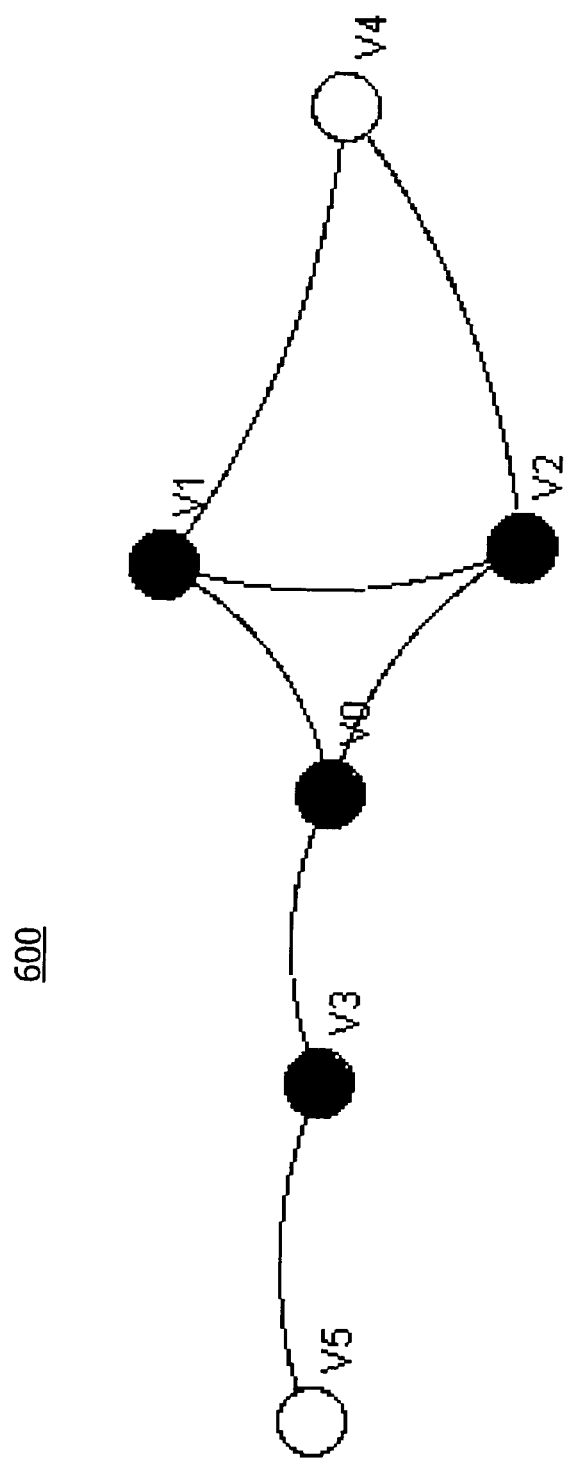
FIG. 6 schematically illustrates the concept of transitive relationships with respect to an exemplary network graph.

As the distance increases the strength of the relationship decreases, therefore it is appropriate to limit the depth of how far to search for relationships. The number of "mutual friends" will also influence the result of the relation. In this case the transitive relationship is stronger than when only one mutual friend exists. The network graph 600 illustrated in FIG. 6 compares two nodes V4, V5 which both have a distance of two from the active node, but one of the nodes is considered to have a stronger relationship due to the number of "mutual friends" it has with the active node V0.

Calculating the Inferred Relationship Value

The inferred relationship, or rank (user rank), of the node under consideration w for the immediate neighbour v is given by the formula below. It should be noted that this does not apply for nodes that have distance larger than one from the node under consideration.

$$\text{user\_rank} = (\text{max\_depth} - \text{distance}) + \frac{|q|_{v,w}}{|Q|_v}$$

where $|q|_{v,w}$ is the number of shared cliques of which node w and node v are members of and $|Q|_v$ is the total number of cliques that the node v is a member of. max_depth is the maximum depth the algorithm will take into account, nodes which have a greater distance than this will not get an inferred value for the node under consideration. The division by the total number of cliques is done to give a percentage of the number of cliques the node is member of. Higher percentage means higher rank.

Calculating the rank for transitive nodes' relationships differs from calculating the rank for direct neighbours. Nodes that do not have direct relations with the node under consideration will have a less strong relationship. However, larger numbers of "mutual friends" will lead to a higher rank. Therefore, the ranking will be partly dependent on how many of the neighbours of node under consideration the specific node is connected with.

As the different neighbours of the node under consideration have different ranks, they must be weighted in the calculation of the transitive relation. The node under consideration is more likely to have a strong relation (in terms of metrics information) with a specific node if they have strong relation with a "mutual friend".

The rank of a specific node can be calculated using the formula below:

$$\text{user\_rank} = \frac{\text{max\_depth} - \text{depth} + 1 - \left(\frac{c}{\text{nr\_of\_mutual\_friends}}\right) - (1-c)\text{mean\_value\_neighbor\_ranks}}{\text{max\_depth} - \text{depth} + 1}$$

In the above formula, the rank increases as the number of "mutual friends" increases and is further increased if these edge values are high. Note that the parameter c is a constant which determines the balance between the importance of the number of mutual friends and the neighbour's rank value. The absolute or relative ranks associated with the neighbours of the node under consideration can be evaluated in context with the service selection procedure. In other words, the likelihood of selecting a specific service used by a direct neighbour having a higher rank is higher compared to another service used by a direct neighbour having a lower rank. It can thus be ensured that only services of particular usability will be recommended.

Approximation

In the following, a second approach to calculate the ranks of the direct or immediate neighbours is presented. This approach involves approximation of the clique count and the clique division. The idea is to find the cliques of the node under consideration to predict a relationship. By dividing the cliques as described above one can find all the smaller cliques. Of these, only the divided cliques that have the node under consideration as a member will be considered further.

Figure 7:
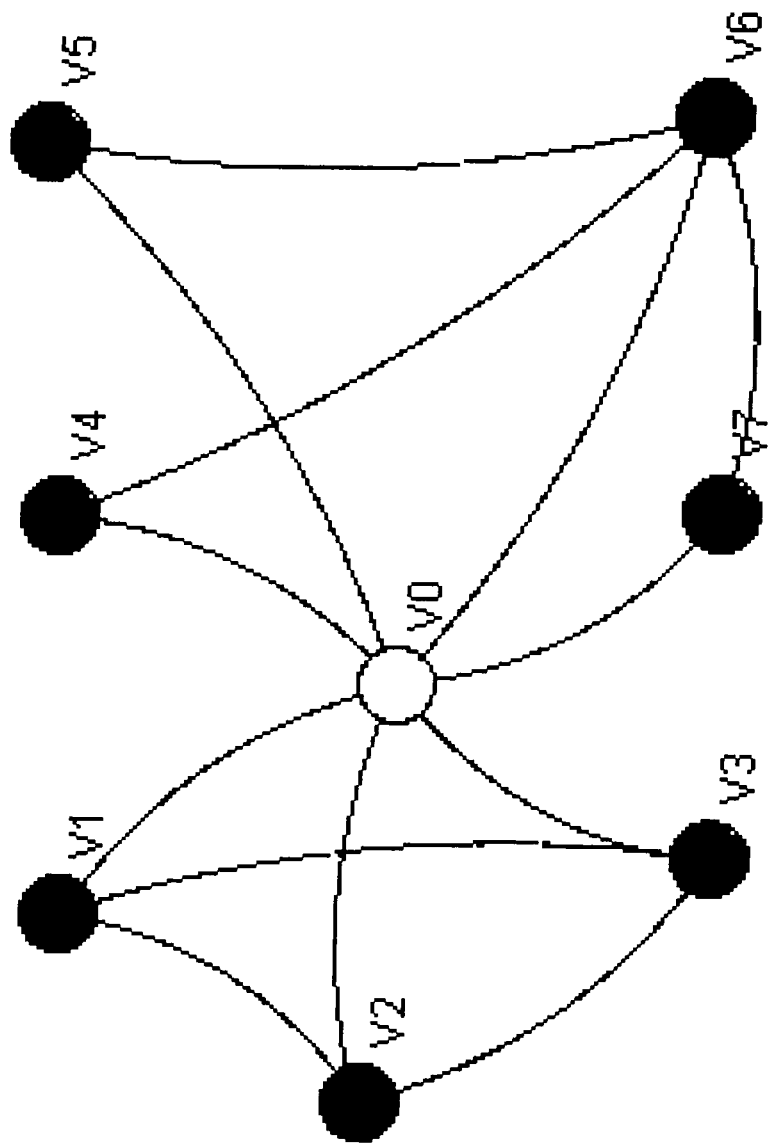
FIG. 7 schematically illustrates a further network graph comprising several cliques.

The network graph 700 of FIG. 7 shows a scenario where cliques are calculated based on the node under consideration V0 as a member of the cliques. The node V6 is a member of three cliques ({V6, V7, V0}, {V6, V4, V0}, {V6, V5, V0}), these are all of size three.

If the clique {V0, V1, V2, V3} is divided into smaller cliques, all must still have V0 as a member, thus it would be split up into {V0, V1, V2}, {V0, V1, V3}, and {V0, V2, V3} (it should be noted that {V1, V2, V3} does not have V0 as a member and is therefore not used). It can be seen that the nodes are members of two cliques each, except for V0. This means that there is a loss of one clique in this clique division. This will lead to different result between the regular clique counting algorithms, but will give a good approximation.

As the number of cliques that the nodes are members of is related to the total number of in and out edges of the node, the number of cliques can be easily computed by subtracting one from the number of in and out edges. For example, V2 has 3 edges and is therefore is a member of 2 cliques which V0 is also a member of.

One can compute the rank of a specific node by using the same formula as in the previous section, but with different definitions of $|Q|_v$ and $|q|_{v,w}$. Specifically the following definitions will be used:

$$|q|_{v,w} = \text{nr\_of\_edges\_of\_v} - 1$$

$$|Q|_v = \frac{\sum_{\forall\_neighbors\_w\_of\_v} |q|_{v,w}}{2}$$

Trust

Figure 8:
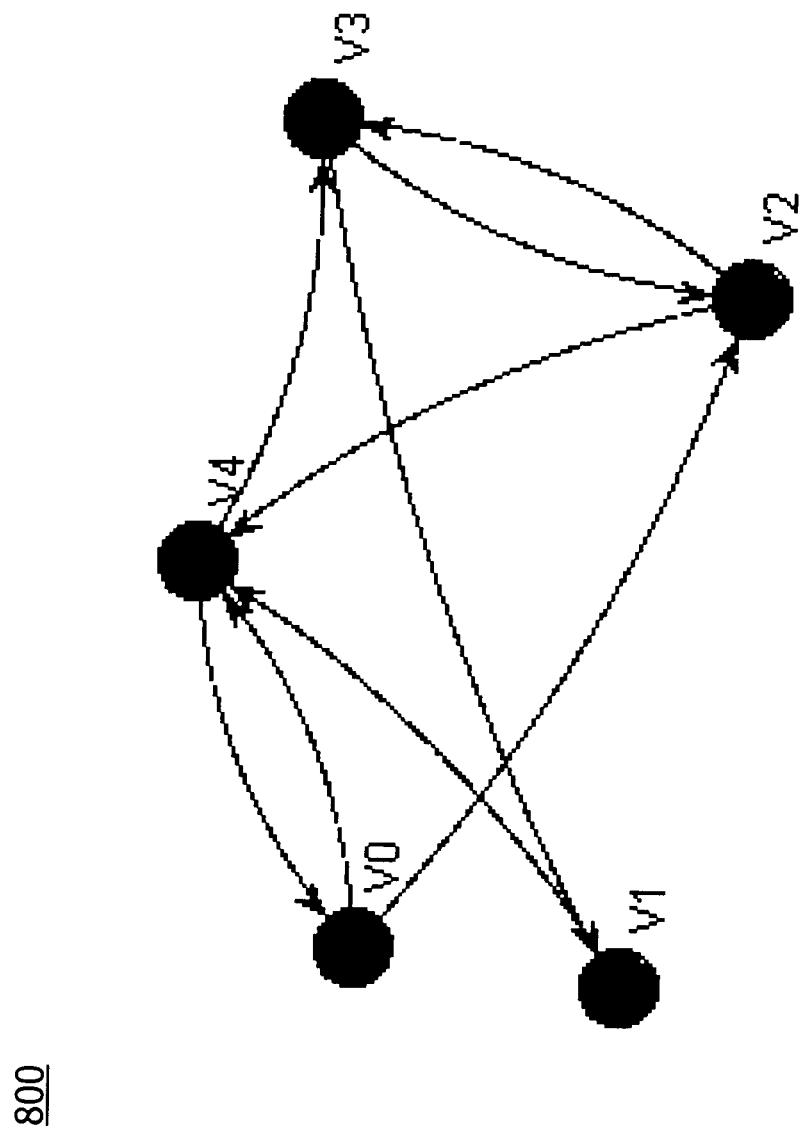
FIG. 8 illustrates a network graph comprising directed edges.

When relationships of trust between the users of different user terminals have been abstractly determined using, for example, topological features such cliques and transitive relationships as outlined above, a network graph 800 can be visualized as shown in FIG. 8. In this network graph 800, directed edges are used taking into account that "trust" is always transitive and asymmetric.

Figure 9:
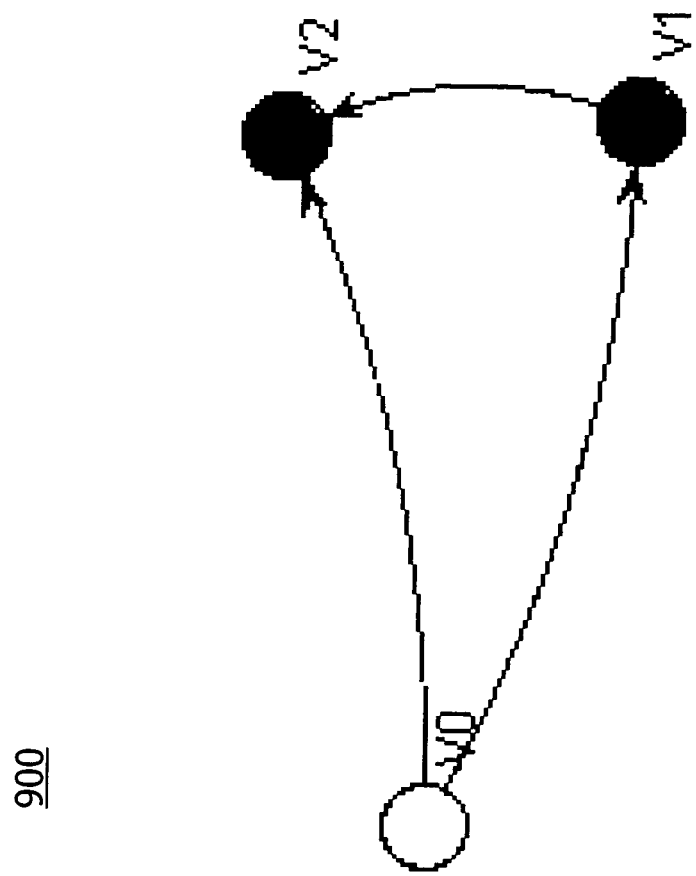
FIG. 9 illustrates the definition of a clique in a network graph including directed edges.
Figure 10:
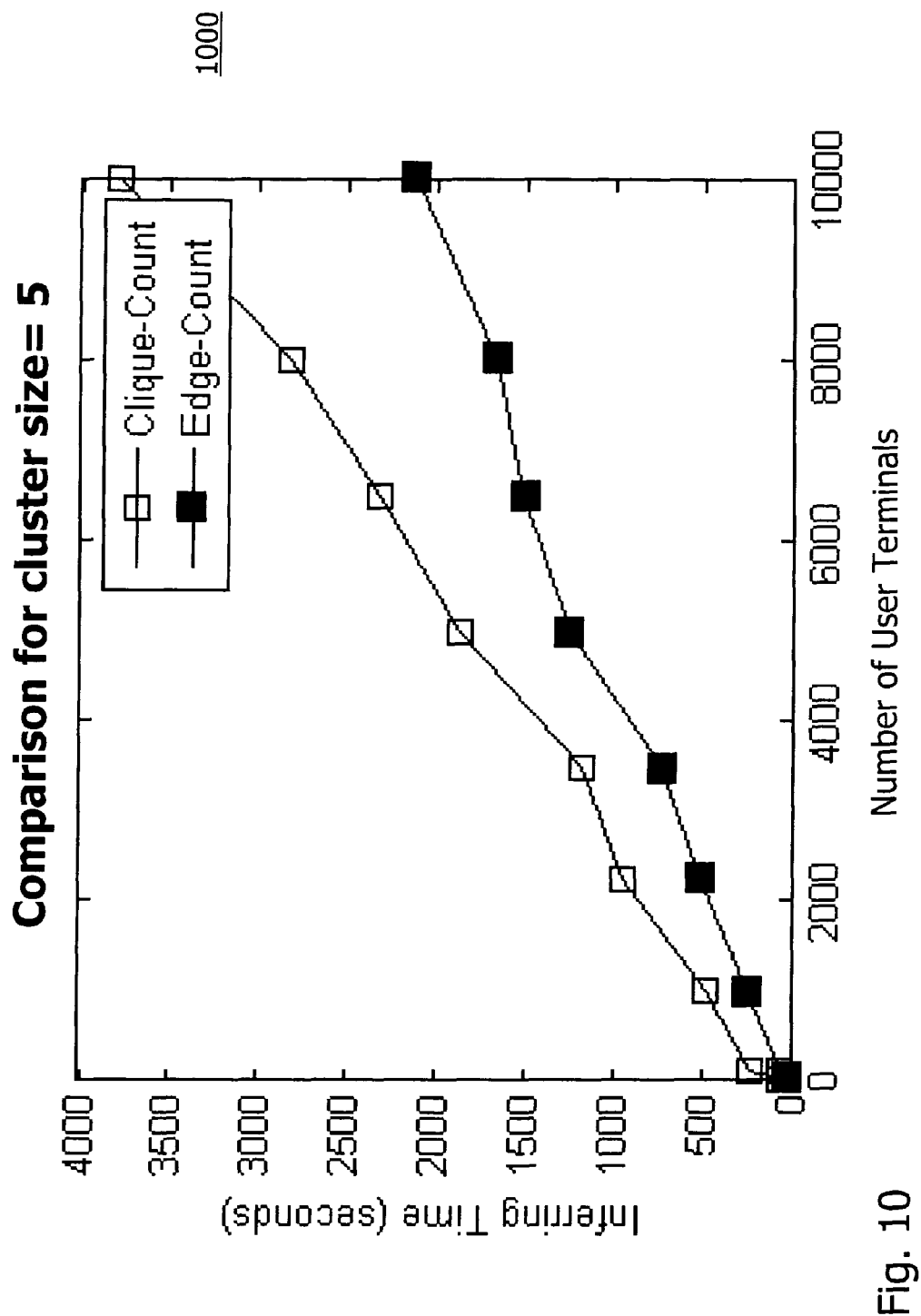
FIG. 10 shows a diagram illustrating a comparison between an edge counting mechanism and an clique counting mechanism with an average cluster size of 5.
Figure 11:
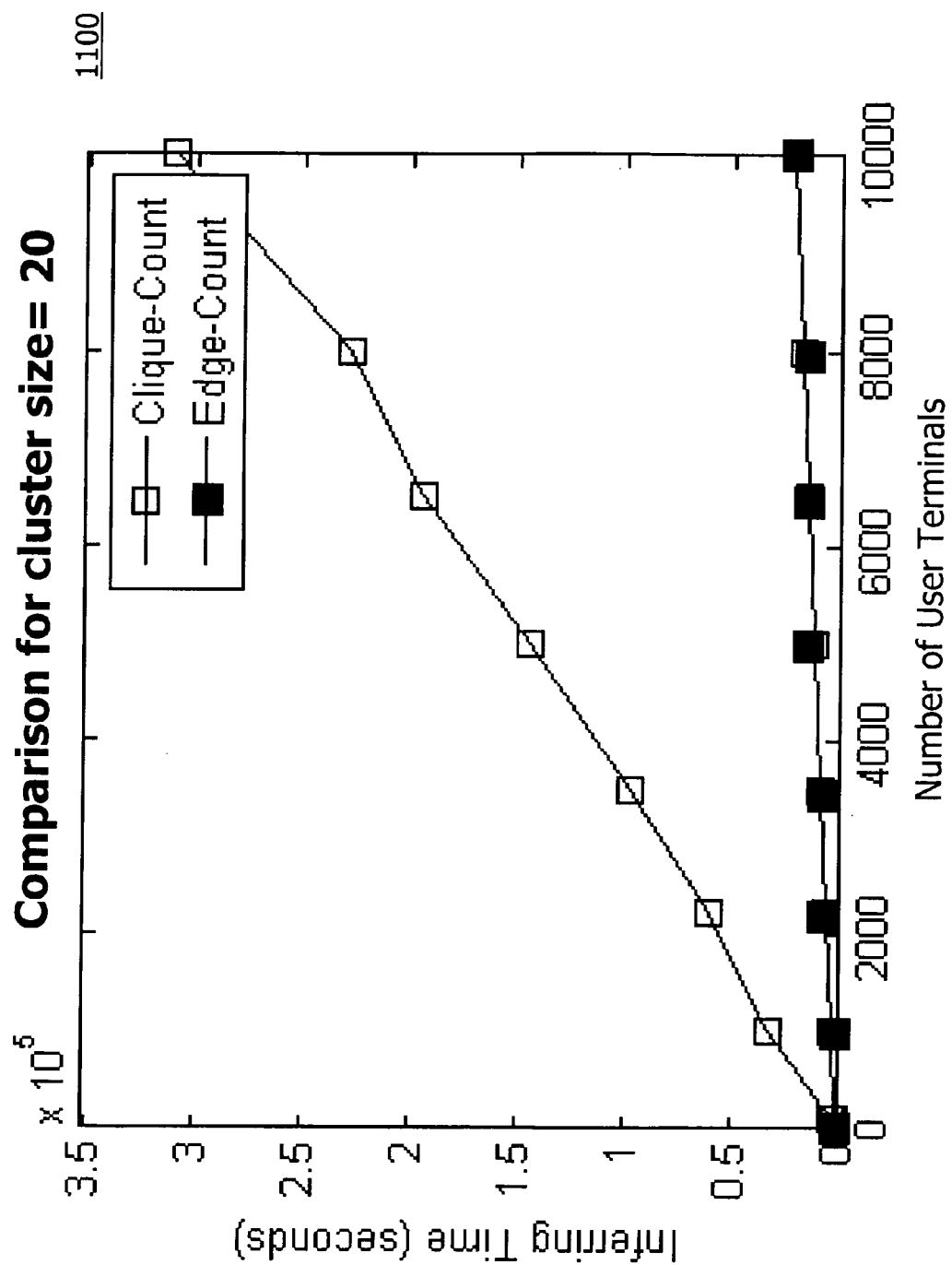
FIG. 11 shows a diagram illustrating a comparison between an edge counting mechanism and an clique counting mechanism with an average cluster size of 20.

In the case of directed graphs as shown in FIG. 8, a special definition of the clique applies. This definition of a clique is that if the node under consideration has two or more neighbours which are "trusted" and if they have a relation in either direction of the graph, then this graph forms a clique. FIG. 9 shows an example of such a clique, where the node under consideration is V0.

Performance Test

A performance test has been conducted to compare the computation algorithm which divides the cliques (called clique-count) and the approximation algorithm that counts the edges (called edge-count). The results show that the edge-count algorithm outperformed the clique count algorithm. The difference increases as the average cluster size in a network graph increases. This is due to the fact that more edges exist when there are larger clusters, and hence more computation, which proves its scalability (see the diagrams 1000 and 1100 of FIGS. 10 and 11, respectively).

Recommendations—Predicting Item Values

To be able to recommend items (such as services) there must be a way to predict how much a user terminal (or any other entity such as the user thereof) would gain from the specific item. The gain may be predicted using the following formula:

$$c(i) = \sum_{p \in P(i)} sim(c, p) * p(i)$$

where c(i) is the rating predicted for item i, sim(c,p) is the similarity between the user terminals (or other entities) c and p, and p(i) is the rated value of user terminal (or entity) p on item i. The similarities between the entities are in this case the relationship value between the entities as determined by any of the approaches discussed above. Using this formula, one can see that entities with higher similarity have higher influence on the value of the item. A higher value of the item indicates a better recommendation for the entity c. This is done for all the items that the direct neighbours have rated. The items with the highest values will be recommended to the entity under consideration.

The advantage of the above technique as illustrated in FIGS. 5 to 11 is the fact that it looks at patterns in the graph which indicate close relationships, in comparison to regular (personalized) trust systems. Since it only looks at the patterns, it is not restricted to any data which makes it very suitable for all kinds of network graphs and in particular for network graphs having directed edges (i.e., where trust can be extracted). The pattern-based technique can be applied (e.g., by the service recommendation component 124 of FIG. 1) to identify microsegments within the graph 300 of nodes exhibiting a similar behavior and for filtering out such services which the user terminal under consideration might not benefit from.

The co-operation between the overlay component 122 and the service recommendation component 124 of FIG. 1 can be described as follows: In one implementation, the overlay component 122 mainly determines the difference in service usage among the user terminals within a given terminal population and then segments the terminal population into groups (based on network graphs as described above). In the groups, the "outsiders" (i.e., the user terminals within a group that do not make use of a specific service) are recommended to use of a specific service. The service recommendation component 124 may then additionally weigh the service recommendations (e.g., to filter-out potentially unsuitable recommendations) as discussed above with reference to FIGS. 5 to 11.

As has become apparent from the above, the service indication techniques described herein are particularly useful in enhancing the connectivity and/or usability of individual user terminals as sophisticated service selection procedures are applied. By taking into account inter-terminal relationships in the service selection procedure service availability indications can be made "personal" so that a user can better understand the benefit of a specific service recommendation. This advantage is the to result of possible cross-correlations between available services on the one hand and terminal-specific network graphs on the other. Moreover, the techniques described herein may provide an explicit feedback regarding service recommendations and service requests, which enables a gradual refinement of the service selection procedure.

While the present invention has been described with respect to particular exemplary embodiments, those skilled in the art will recognize that the present invention is not limited to the specific examples described and illustrated herein. It is to be understood that this disclosure is only illustrative. Accordingly, it is intended that the invention be limited only by the scope of the claims appended hereto.

The invention claimed is:

1. A method of providing a service availability indication to a user terminal, comprising:
   obtaining a data structure representative of user terminals and of inter-terminal relationships derived from one or more communication parameters pertaining to communications between the user terminals;
   obtaining, for at least some of the user terminals, service utilization information for each of a plurality of services;
   selecting, for at least one user terminal and from the plurality of services, a service not used by the at least one user terminal, wherein the selecting is based on the service utilization information provided for user terminals having a predefined association with the at least one user terminal as determined by the inter-terminal relationships;
   sending a message indicative of the selected service to the at least one user terminal; and
   providing the selected service, or access to the selected service, to the at least one user terminal when the at least one user terminal uses the selected service.

2. The method of claim 1, wherein the data structure represents a network graph with nodes and edges that connect those nodes together, wherein the nodes correspond to user terminals and the edges are derived from the inter-terminal relationships.

3. The method of claim 2, wherein the service selection is based on the service utilization information provided for user terminals within a predefined distance to the at least one user terminal in the network graph.

4. The method of claim 2, wherein each edge is associated with metrics information quantifying an interrelation between nodes connected by the edge, and wherein the metrics information is derived from the one or more communication parameters.

5. The method of claim 4, wherein the service selection is based on the service utilization information provided for user terminals having at least a predefined interrelation to the at least one user terminal, as quantified by the metrics information associated with respective edges connecting those user terminals to the at least one user terminal.

6. The method of claim 2, wherein one or more of the edges are directed, and wherein the predefined association underlying the service selection is defined at least in part in terms of the direction between edges connecting user terminals to the at least one user terminal.

7. The method of claim 2, wherein at least some of the user terminals are ranked based on at least one of their membership in cliques and the extent to which their relationship with the at least one user terminal is transitive, and wherein the service selection is based on the service utilization information provided for user terminals having at least a predefined rank.

8. The method of claim 2, wherein each edge is associated with separate metrics information for each of a plurality of communication services.

9. The method of claim 1, wherein the service utilization information pertains to communication services, and wherein the selected service is a communication service.

10. The method of claim 9, wherein the communication services include one or more of voice services, text-based services, data services, multimedia services, instant messaging services, and community services.

11. The method of claim 1, wherein the service utilization information pertains to application services, and wherein the selected service is an application service.

12. The method of claim 1, further comprising ranking the plurality of services in accordance with the service utilization information, and wherein the service selection is further based on the service ranking.

13. The method of claim 12, wherein the service ranking depends on the total usage of each individual service by the plurality of user terminals.

14. The method of claim 1, wherein the one or more communication parameters pertaining to communications between the user terminals include at least one of the particular user terminals involved in the communications, the duration of those communications, the number of communications, the direction of those communication, and the kind of communication service utilized for those communications.

15. The method of claim 1, wherein the one or more communication parameters are obtained from at least one of call detail records, event detail records, communication network interface probing, and user terminal agents.

16. A method of recommending one or more services to a user terminal, comprising:
   obtaining a data structure that indicates a degree to which the user terminal is communicatively networked to each of a plurality of other user terminals based on the user terminal having previously communicated with at least some of the other user terminals, and the other user terminals having previously communicated amongst themselves;
   obtaining service utilization information that indicates services utilized by the other user terminals;
   selecting for recommendation to the user terminal one or more services that, according to the obtained data structure and service utilization information, are utilized by other user terminals to which the user terminal is communicatively networked to at least a predefined degree;
   sending to the user terminal a message indicative of the one or more services selected for recommendation; and
   when the user terminal uses one of the one or more services selected for recommendation, providing that service, or access to that service, to the user terminal.

17. The method of claim 16, wherein the service utilization information further indicates the extent to which the services are utilized by the other user terminals, and wherein said selecting comprises selecting one or more services that are utilized to at least a predefined extent.

18. A system configured to provide a service availability indication to a user terminal, comprising:
   memory configured to store a data structure representative of user terminals and of inter-terminal relationships derived from one or more communication parameters pertaining to communications between the user terminals, and to store, for at least some of the user terminals, service utilization information for each of a plurality of services;
   one or more processors configured to select, for at least one user terminal and from the plurality of services, a service not used by the at least one user terminal, wherein the one or more processors are configured to select the service based on the service utilization information for user terminals having a predefined association with the at least one user terminal as determined by the inter-terminal relationships; and
   an output interface configured to send a message indicative of the selected service to the user terminal;
   wherein the system is configured to provide the selected service, or access to the selected service, to the at least one user terminal when the at least one user terminal uses the selected service.

19. The device of claim 18, wherein the data structure represents a network graph with nodes and edges that connect those nodes together, wherein the nodes correspond to user terminals and the edges are derived from the inter-terminal relationships.

20. The device of claim 19, wherein the one or more processors are configured to select the service based on the service utilization information for user terminals within a predefined distance to the at least one user terminal in the network graph.

21. The method of claim 1, wherein the method is implemented by a communication service provider network, wherein the selected service is a communication service provided by the communication service provider network, and wherein said providing comprises providing the selected service to the at least one user terminal when the at least one user terminal uses the selected service.

22. The method of claim 1, wherein the method is implemented by a communication service provider network, wherein the selected service is an application service provided by a service-provisioning network to which the at least one user terminal attaches via the communication service provider network, and wherein said providing comprises providing the at least one user terminal with access to the selected service when the at least one user terminal uses the selected service.

23. The method of claim 16, wherein the method is implemented by a communication service provider network, wherein the one or more services selected for recommendation comprise one or more communication services provided by the communication service provider network, and wherein said providing comprises, when the user terminal uses one of the one or more services selected for recommendation, providing that service to the user terminal.

24. The method of claim 16, wherein the method is implemented by a communication service provider network, wherein the one or more services selected for recommendation comprise one or more application services provided by a service-provisioning network to which the user terminal attaches via the communication service provider network, and wherein said providing comprises, when the user terminal uses one of the one or more services selected for recommendation, providing the user terminal with access to that service.

25. The system of claim 18, wherein the system is associated with a communication service provider network, wherein the one or more services selected for recommendation comprise one or more communication services provided by the communication service provider network, and wherein the system is configured, when the user terminal uses one of the one or more services selected for recommendation, to provide that service to the user terminal.

26. The system of claim 18, wherein the system is associated with a communication service provider network, wherein the one or more services selected for recommendation comprise one or more application services provided by a service-provisioning network to which the user terminal attaches via the communication service provider network, and wherein the system is configured, when the user terminal uses one of the one or more services selected for recommendation, to provide the user terminal with access to that service.

* * * * *

UNITED STATES PATENT AND TRADEMARK OFFICE
CERTIFICATE OF CORRECTION

PATENT NO. : 9,294,992 B2
APPLICATION NO. : 13/124460
DATED : March 22, 2016
INVENTOR(S) : Mattias Lidström, Michel Shahan and Martin Svensson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 889 days.

Signed and Sealed this
Fifth Day of July, 2016

Michelle K. Lee
*Director of the United States Patent and Trademark Office*